Sept. 16, 1947.   O. H. BANKER   2,427,346
CLUTCH
Filed Nov. 13, 1943   5 Sheets-Sheet 2

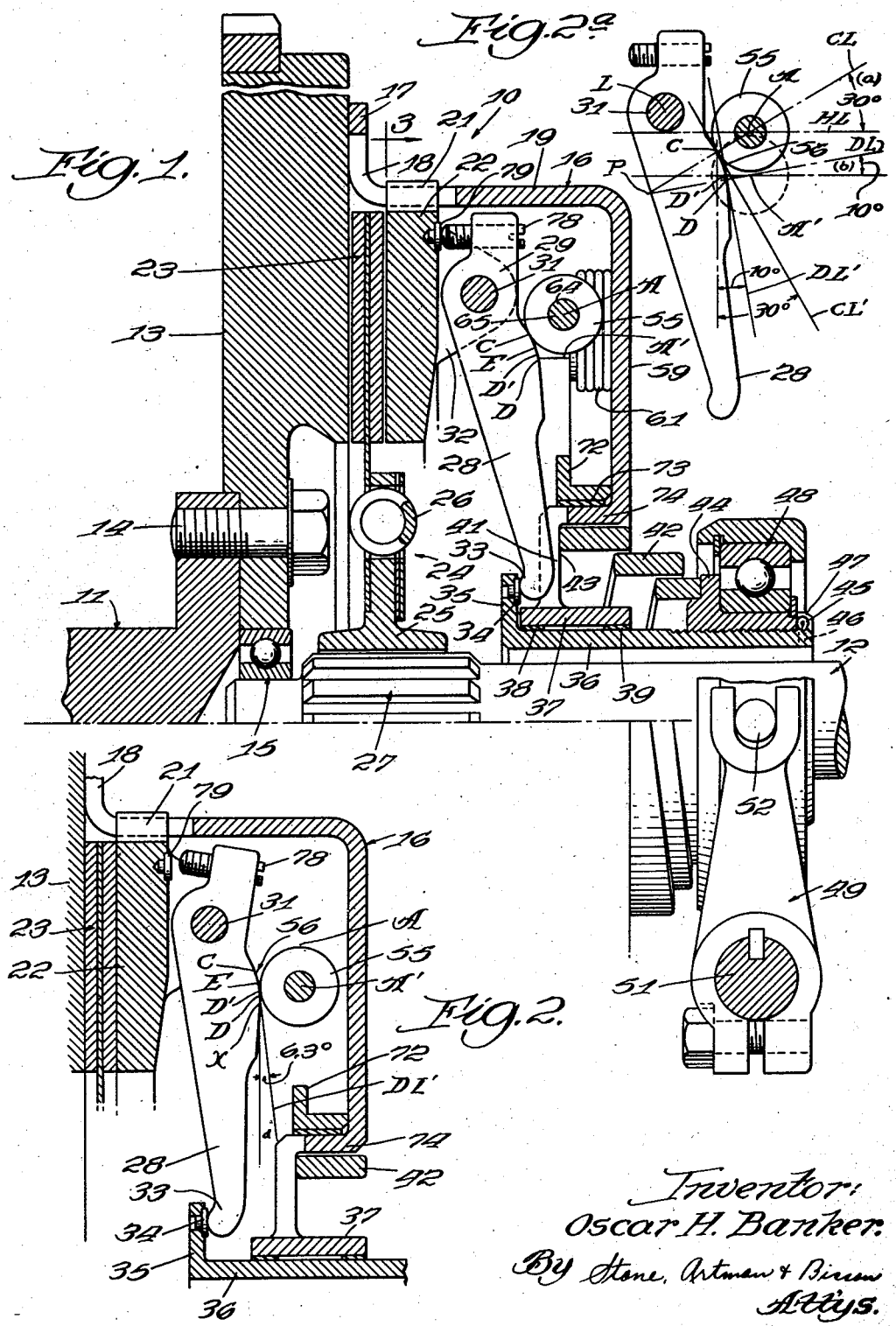

Inventor:
Oscar H. Banker
By Stone, Artman & Birson
Attys.

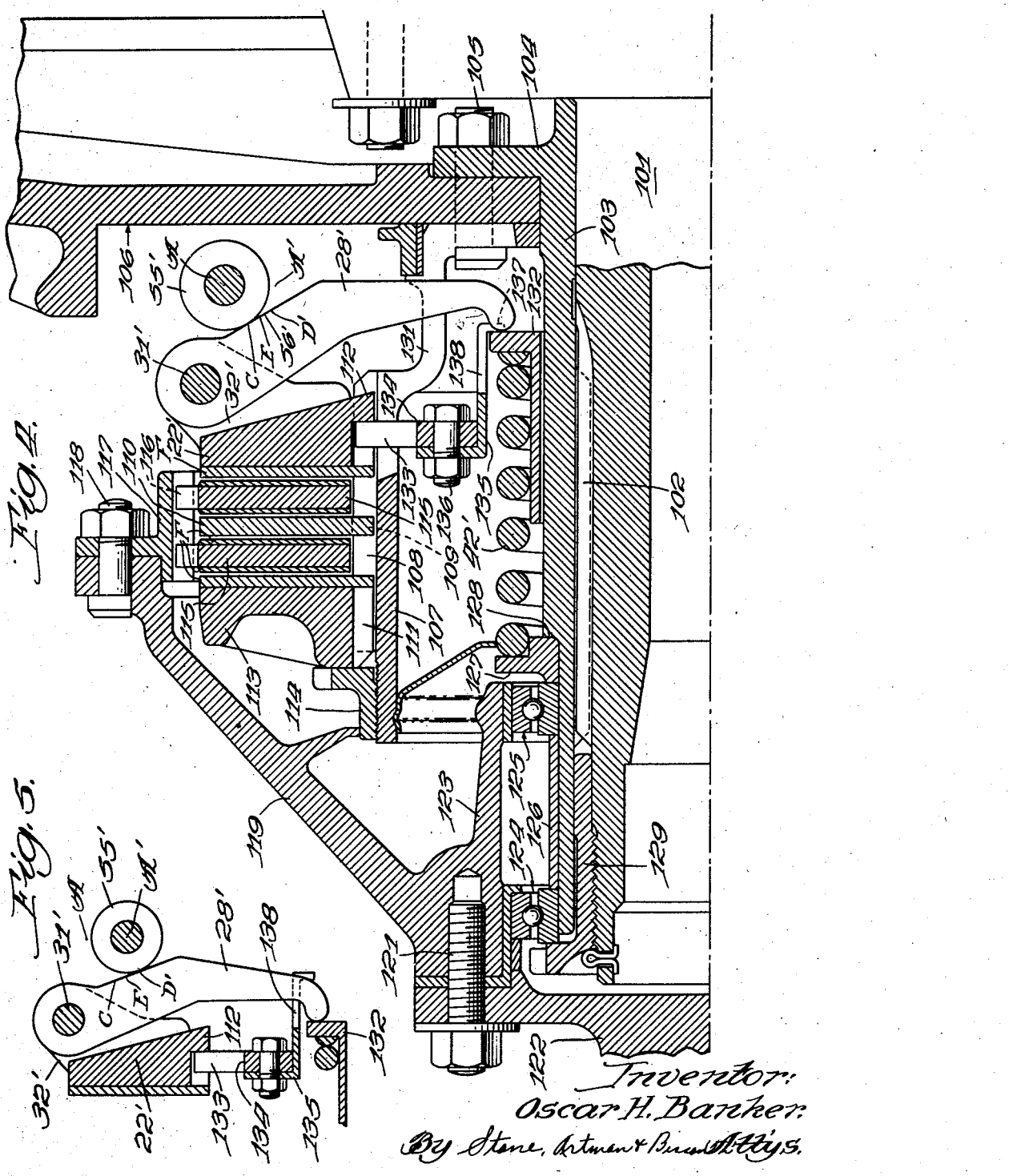

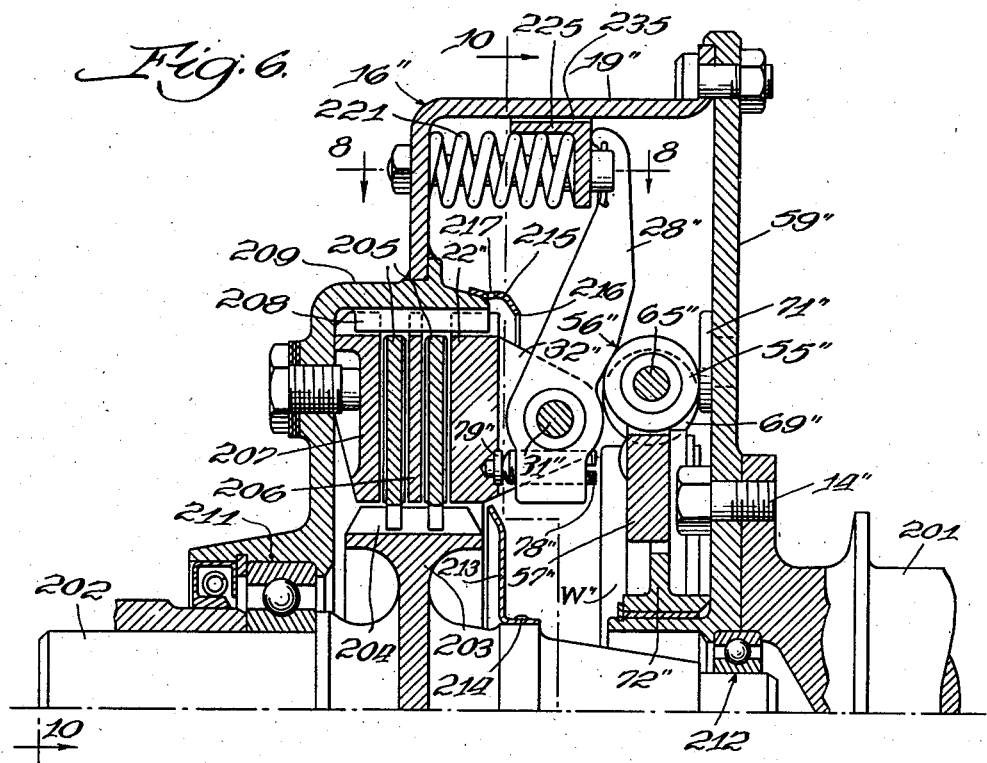
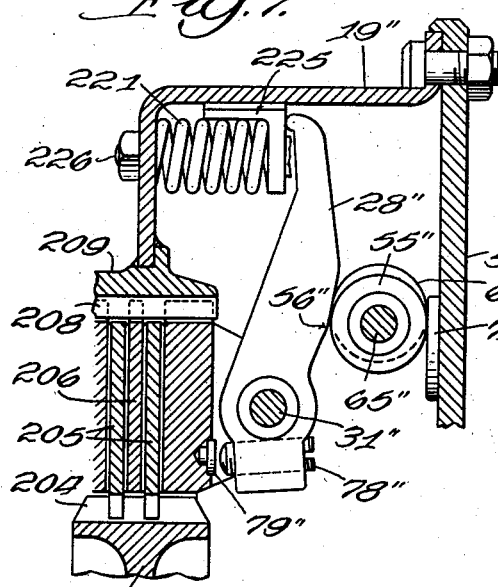
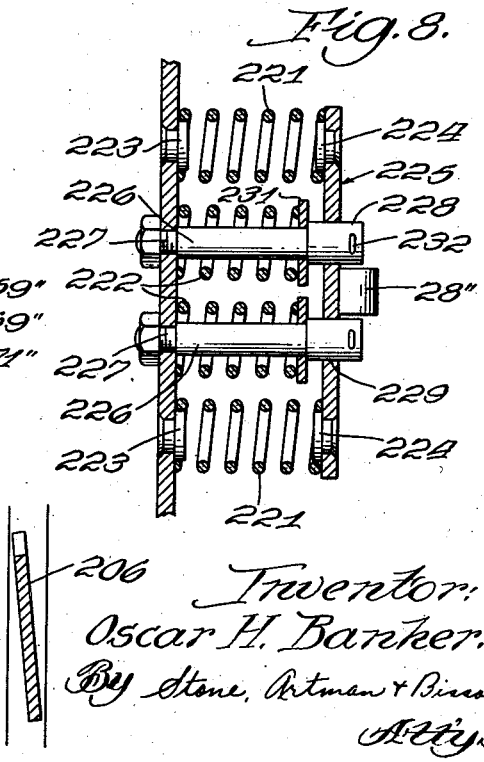

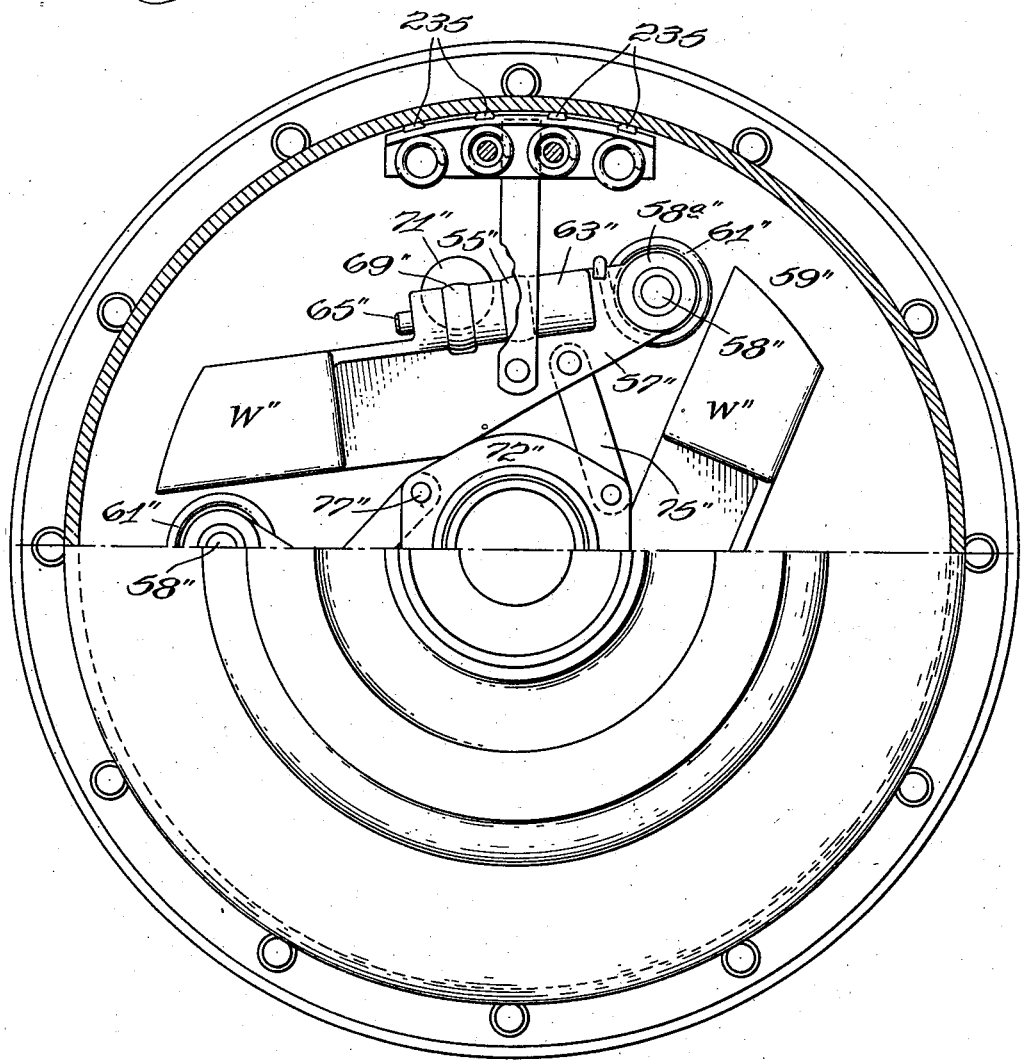

Patented Sept. 16, 1947

2,427,346

UNITED STATES PATENT OFFICE 2,427,346

CLUTCH

Oscar H. Banker, Evanston, Ill., assignor to New Products Corporation, Chicago, Ill., a corporation of Delaware Application November 13, 1943, Serial No. 510,147

28 Claims. (Cl. 192—103)

This invention has to do with a clutch and more particularly to the mechanism for engaging the same. The mechanism is operable to control clutch-engaging force in a manner preventing initial engagement of the clutch until the force has attained a desired magnitude and thereafter incurring complete engagement by a moderate desired increase of the force.

The invention is susceptible of embodiment in designs to independently select the forces respectively required to initiate and to complete clutch engagement, making it particularly useful in motor vehicle installations employing a clutch engaged by force derived from a device responsive to a function of vehicle engine speed. One cardinal shortcoming of the speed-responsive friction clutch in automobiles between the engine and road wheels has been the correlation between the speed at which the drive and driven friction parts are "initially" pressed into frictional engagement and the speed at which these parts are pressed together with sufficient force to establish the fully or "ultimate" engaged condition of the clutch in which it is operable to transmit driving force at its rated capacity. Difficulty has arisen when the "initial" engaging speed exceeds engine idling speed the desired amount to obtain proper engine warm-up racing or develop sufficient engine power to meet emergency starting conditions as where it is imperative to start the vehicle from rest up a steep incline. In prior installations when the springs opposing the force of the speed-responsive device were made strong enough to prevent "initial" engagement up to the desired speed, the "ultimate" engagement speed has been too high, resulting in a wide speed band in which the clutch would be partially engaged but incapable of transmitting force at its rated capacity.

An important object of this invention is the provision of a novel force applying mechanism employable between the speed-responsive device of a speed-responsive clutch and the drive and driven parts thereof to control the width of the speed band between the "initial" and "ultimate" engagement speeds independently of the "initial" engagement speed.

The invention contemplates and has for one of its objects the provision of a novel cam and mounting therefor by means of which the profile of such cam is contributory to the determination of the engaging and disengaging characteristics of the clutch, making it possible to predetermine the aforesaid "initial" and "ultimate" engaging speeds as well as a "release" speed at which the clutch begins retrocession from its rated load carrying condition.

A further object is the provision of a novel clutch-engaging lever arrangement wherein the lever is receivable of force at an intermediate portion for imposing clutch engaging force through an end portion while reacting upon yieldable means at its opposite end portion. This arrangement is such that the force received at the lever intermediate portion from a fulcrum member as it is advanced generally lengthwise of the lever can be divided between the end portions as desired for causing the lever to tilt and thereby change the resistance to the movement of the force-applying fulcrum member per unit of force increment transmitted through the lever to its end portions.

It is also an object of this invention to form the clutch engaging lever with a profile of desired contour at the intermediate portion along which the fulcrum member is advanced, to change the slope of the profile at successive points engaged by the fulcrum member, to correspondingly change the ratio of the force component applied to the lever normally of the path of advancement of the fulcrum member to the component in the direction of such advancement.

Another object is the provision in a clutch having a pressure applying element advanceable into a pressure applying position for engaging the clutch, of a bodily advanceable lever having an end portion associated with said element for advancing the same therewith together with means at the opposite end portion of the lever for yieldably resisting its advancement and means preventing tilting of the lever when an advancing force is applied at an intermediate portion thereof until the lever is thereby bodily advanced, in opposition to the yieldable means, to place the pressure applying element in its pressure applying position. This arrangement makes it possible to incur the undivided force of the yieldable means for opposing advancement of the pressure applying element into the position where the clutch starts to engage and to thereafter divide the increment of advancing force according to a predetermined ratio between the end portions so the clutch will have a "soft" engaging character when its "initial" engagement commences and so the clutch can be released at will by manual manipulation of the yieldable means to terminate the application of its reactive force on its associated lever end portion. It is also contemplated to employ one or more slightly cupped annular friction elements in the clutch to further contribute to the "softness" of the engagement.

Another object of the invention is the provision of a yieldable means as in the next preceding object in the form of successively operable springs of which the springs first and initially operating oppose the bodily movement of the lever until the pressure applying element begins the "initial" engagement of the clutch, and the succeeding spring thereupon becomes effective for supplementing the force of the initially effective spring in opposing tilting of the lever and thereby increases the reactive force applied to the end portion of the lever opposite to that with which the pressure applying element is associated to correspondingly increase the amount of force appliable to the pressure applying element by force imposed upon the intermediate portion of the lever, increasing the load capacity of the clutch. The advantage is gained of being able to use smaller springs together with correspondingly smaller weights, decreasing the mass of the clutch while the apparatus is still operable to obtain the desired "initial" engaging speed.

A further object of the invention is the provision of a novel clutch engaging and disengaging means operable under the control of a speed responsive device in a manner which it is possible to independently predetermine the "initial" and "ultimate" engaging speeds of the clutch as well as a "release" speed. By the employment of a clutch engaging means which makes it feasible to begin the actual pressure application between frictionally engaged driving and driven parts at a higher speed, the engagement of the clutch is obtained with greater smoothness or uniformity since the forces developed by the speed responsive apparatus are greater with respect to friction forces and the like resisting movement of the clutch engaging parts, causing the force of the speed responsive apparatus to emphatically prevail.

A further object of the invention is the provision of a clutch engaging and disengaging control means according to any of the preceding objects, and wherein one or more annular friction elements of the clutch is cupped and disportable into conformity with complemental friction elements upon the application of the engaging pressure to the clutch, for incurring a condition in which the area of frictional engagement of this cupped element with the complemental elements is progressively increased during engagement of the clutch and to thereby contribute to an improvement in the evenness with which the power transmitting ability of the clutch is increased.

An additional object of the invention is the provision of a novel oil guard means for deflecting oil from the friction elements of the clutch both while the clutch is rotating and while it is at rest.

These and other desirable objects inherent in and encompassed by the invention will be more readily understood after reading the ensuing description with reference to the accompanying drawings, wherein:

Fig. 1 is a fragmentary sectional view taken axially through a friction clutch device associated with the flywheel of a motor car engine and illustrating a preferred form of the invention employable for engaging the clutch;

Fig. 2 is a fragmentary sectional view of the clutch operating parts constructed according to the present invention, which are also shown in Fig. 1 but the present view showing these parts in the position they occupy when the clutch is engaged;

Fig. 2a is a side elevational view of a clutch actuating lever also shown in Figs. 1 and 2, together with loci and lines employed for determining a cam profile of the lever;

Fig. 4 is a view taken similarly to Fig. 1 through a different form of clutch and also illustrating a different form of actuating mechanism constructed according to the principles of the present invention for engaging the clutch;

Fig. 5 is a fragmentary sectional view of the clutch actuating mechanism in Fig. 4 but showing the parts in a position occupied when the clutch is engaged;

Fig. 6 is also a view taken similarly to Fig. 1 and through a third form of clutch and illustrating a third form of the invention employed for engaging the clutch;

Fig. 7 is a fragmentary sectional view of the clutch actuating parts in Fig. 6, illustrating these parts in the position occupied when the clutch is engaged;

Fig. 8 is a fragmentary sectional view taken through the springs constituting part of the clutch actuating mechanism in Fig. 6 and taken on a plane indicated by the line 8—8 in that figure;

Fig. 9 is an enlarged sectional view illustrating with some exaggeration the cupping of the central friction disk upon the driving part of the clutch in Fig. 6;

Fig. 10 is a transverse sectional view taken as indicated by the line 10—10 in Fig. 6 illustrating the form of speed-responsive mechanism and clutch actuating means employed in this third form of the invention.

The ensuing description will be divided into sections respectively relating to the three forms of the invention.

Figure 3:
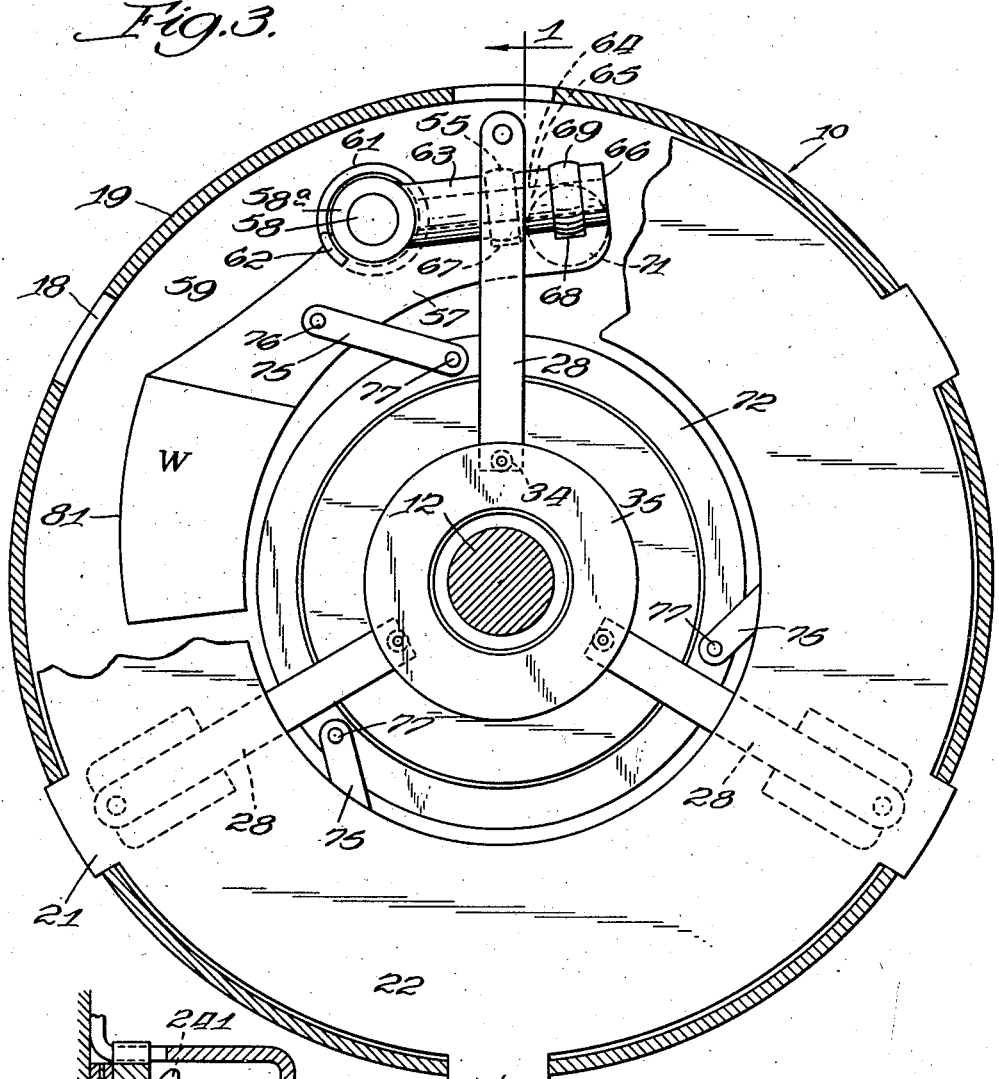
Fig. 3 is a transverse sectional view taken through the clutch of Fig. 1 substantially upon the line 3 and with a part of the clutch pressure plate broken away to disclose one of the centrifugal weights for engaging the clutch.

*Embodiment in Figs. 1 to 3*

The first embodiment of the invention is illustrated in conjunction with a friction clutch generally designated 10. This clutch is for establishing and disestablishing a driving connection between a drive shaft 11 which in the present instant is the crank shaft of a motor vehicle engine, and a driven shaft 12 which may be the drive shaft leading into the gear box of any conventional change-speed transmission.

The usual flywheel 13 is attached to the drive shaft 11 by a plurality of bolts 14 of which one is shown in the drawings. The front or left end of the driven shaft 12 is held in coaxial relation with the drive shaft 11 by means of a pilot ball bearing unit 15 of which the outer and inner races are respectively attached to the outer periphery of a central hole in said flywheel and to a forward portion of the driven shaft.

A cup-like clutch casing 16 is attached to the back or right face of the flywheel 13 by means of a plurality of bolts (not shown) distributed circumferentially about a circumferential flange 17 of said casing and inserted through respective holes in that flange and turned into threaded recesses (not shown) therefor in said flywheel. A plurality of circumferentially spaced slots 18 are formed in the casing 16 at the juncture of the flange 17 with a cylindrical portion 19 of the casing. There are six of these slots in the present case as can be seen by an examination of Fig. 3. Slots 18 are for the reception of radial lugs 21 spaced circumferentially about the outer circumference of an annular pressure plate 22.

A driven element of the clutch comprises an annular friction portion 23 compressible between the pressure plate 22 and an annular rear face portion of the flywheel 13. This annular friction portion of the clutch driven member 24 is connected to a hub 25 of such driven element by a series of generally circumferentially directed and spaced helical springs 26 in a manner well known in the art and, for example, as illustrated in United States Patent No. 2,143,113. The hub 25 is splined to the driven shaft 12 at 27. That part of the disclosure thus far described is conventional. A novel part of the structure which constitutes this invention is the means now to be described for pressing the pressure plate element 22 to the left for frictionally engaging the friction portion 23 of the clutch driven element 24 between said pressure plate and the rear face of the flywheel to thereby create a force transmitting condition of the clutch wherein force is transmittable through the clutch from the drive shaft 11 to the driven shaft 12. The mechanism now to be described also controls the establishment of the released condition of the clutch from its engaged or force transmitting condition.

A set of three clutch engaging members or levers 28 are employed for advancing the annular element 22 for creating the force transmitting condition of the clutch. These members or levers 28 are directed radially of the clutch and are spaced equidistantly circumferentially thereof as shown in Fig. 3. Since these levers and the parts cooperating with each are the same the description will be directed particularly to the lever and its associated parts shown in full lines in Figs. 1 and 2. This lever has an outer (radially of the clutch) end portion 29 pivotally mounted upon a pin 31 carried within a pair of opposed ears 32 on the back face of the pressure plate. An inner end portion 33 of the lever 28 is abuttable against a hardened bearing member 34 within a flange 35 upon the left or forward end of an axially movable sleeve 36 surrounding the driven shaft 12 and carried within a circular wall 37 formed within the center of the casing 16 upon bearing rings 38 and 39. Slots 41 are formed in the back wall of the clutch casing 16 to receive the inner ends of the levers when they are in their retracted position illustrated in Fig. 1. The inner ends 33 of the levers 28 are urged into this retracted position by a spiral spring 42 of which the end of larger diameter reacts against a recessed back wall portion 43 of the casing 16 and of which the rightmost or back end which is of smaller diameter reacts against a member 44 threaded onto the back end of the sleeve 36. Accidental unscrewing of the member 44 from the sleeve 36 is prevented by a key member 45 inserted into a hole 46 in the sleeve and projecting into a notch 47 formed in the back end of said member 44. Backward movement of the sleeve 36 beyond the position shown by the spring 42 is precluded by a lever actuating roller 55 and a setscrew 78 which cooperate in a manner presently fully described.

The spring 42 may be compressed by axial forward movement of the sleeve 36 by a force received from the inner ends of the levers 28, or said spring may be compressed by the forward advancement of a clutch throw-out bearing unit 48 by the rocking of a throw-out bearing yoke 49 when a clutch operating shaft 51, upon which this yoke is rotatively fixed, is rotated counter-clockwise as viewed in Fig. 1. Incident to such counter-clockwise rocking of the control shaft 51 the upper ends of the yoke arms transmit forward movement to the throw-out bearing 48 through diametrically disposed pins 52 which are anchored within the outer race of said bearing, and the resulting forward movement of the throw-out bearing 48 in addition to compressing the spring 42 displaces the sleeve 36 forwardly for releasing the clutch in a manner presently to be described. Thus means is provided for manually releasing the clutch at any time that it is engaged by speed responsive means also presently to be described.

When the lever actuating roller 55 is moved radially inwardly from the position shown in Fig. 1 it will roll along a cam profile section 56 of the lever 28 and in doing so will ultimately reach a position illustrated in Fig. 2. Pursuant to the radial inward movement of the roller 55 the inner end of the lever 33 is caused to move forwardly against the yieldable resistance of the spring 42, and while in the position of Fig. 2 the roller 55 serves as a fulcrum member whereby the rearward force imposed upon the inner end of said lever by the spring 42 is balanced by a force applied forwardly by the outer end portion 29 of said lever upon the pin 31 and thence through the ears 32 to the pressure plate 22 which is thus advanced into its pressure applying position for engaging the clutch. Fig. 2, therefore, illustrates the clutch and those parts of the clutch actuating mechanism there shown in the "engaged" position. Centrifugal means for advancing the fulcrum member or roller 55 from the Fig. 1 position in which the clutch is disengaged to the Fig. 2 position in which the clutch is engaged is clearly illustrated in Figs. 1 and 3.

The three rollers 55 are associated with respective centrifugal weights W. Each weight as the weight W has a shank 57 in which there is a hub 58ª pivoted upon a pin 58 anchored in the back wall 59 of the clutch casing 16. A coil spring 61 about the pin 58 has one end portion (not shown) reacting against a portion of the wall 59 while its opposite end 62 is hooked about an edge of the weight shank 57 for urging the weight radially inwardly of the clutch. A stem-like portion 63 of the weight shank projects generally oppositely from the hub 58ª as the weight W and is bored at 64, Fig. 1, radially of the weight hub 58ª for receiving a pin 65. The hole 64 reaches completely to the outer end 66 of the stem-like portion 63 so that the pin 65 may be inserted endwise through said end 66. Roller receiving notches 67 and 68 are formed in the stem-like portion 63 for receiving the rollers 55 and a second roller 69 each of which is journalled upon the pin 65. The rollers 55 and 69 are freely and independently rotatable upon the stem 65, the roller 55 registering with the curved profile 56 upon its associated clutch actuating lever 28 while the roller 69 registers with and bears upon a circular reaction plate 71 of hardened material suitably anchored in the back wall 59 of the clutch casing. Clutch weights and rollers of this character are shown in greater detail and fully described in my copending application Serial No. 444,867, filed May 28, 1942, for Clutch.

Outward movement of the weight W by the action of centrifugal force when the drive shaft, the clutch casing and the pressure plate 22 are rotated is opposed by the spring 61. This outward movement of the weight advances the fulcrum member roller 55 along the cam profile 56 of its associated clutch actuating lever 28 for advancing this lever together with the pressure plate 22 for ultimately engaging the clutch. An equalizer ring 72, journalled upon a bearing ring 73 supported upon a circular inwardly projecting portion 74 of the clutch back wall is connected to each of the weights W by links 75 respectively associated with said weights. Pivotal connections 76 and 77 are provided between the outer ends of the links 75 and said weights and between the inner ends of said links and the equalizer ring. These links 75 and the equalizer ring 72 function to cause operation of the weights W and their fulcrum member rollers 55 in concert.

In the operation of the clutch, assuming it to be installed upon a motor vehicle which is at rest and assuming the driven shaft 12 to be drivingly connected with the road wheels of such vehicle, forward movement of the vehicle can be incurred by accelerating the vehicle engine for accelerating the rotational speed of the crank shaft 11 predeterminedly above engine idling speed.

The centrifugally operated clutch engaging mechanism herein shown is operable to prevent the pressure plate 22 reaching a pressure applying relation with respect to the clutch driven element 24 until the drive shaft 11 and the engine with which it is connected have attained a speed predeterminedly above engine idling speed. The purpose of this operating characteristic of the apparatus is to enable the operator of the vehicle, to race the vehicle engine for warming it up as is sometimes desirable in cold weather before actually starting the vehicle. If the speed-responsive apparatus were operable to begin the application of pressure between the driving and driven elements of the clutch immediately upon the engine exceeding idling speed, such warm up racing of the engine would be possible only after disconnecting the driven shaft 12 from the road wheels by means of an auxiliary clutch or disconnecting arrangement. It would also be well to realize at this time that the present mechanism is operable to increase the speed at which the clutch is started to engage to any desired speed above idling speed without concomitant expansion of the speed range in which full clutch engagement is brought about. Conceivably it would be possible to select the speed above idling speed at which it is desired that the centrifugal force of the weights W would be effective for overcoming the force of their springs 61 for causing the pressure plate 22 to commence application of a substantial pressure upon the clutch driven element, and the practice heretofore of accomplishing that is simply to decrease the size of the weights or increase the strength of the springs, but modifying the weights or springs in this manner would have the undesirable effect of increasing the range of speed between that at which the pressure plate begins the application of pressure upon the clutch driven element and that speed at which sufficient pressure is applied to the clutch driven element for conditioning the clutch to transmit rotational force between its drive and driven elements for which the clutch is designed.

With the clutch constructed according to the present principles the speed at which the pressure plate begins to apply engaging pressure to the clutch driven element may be selected and at the same time the additional speed required for fully engaging the clutch can be independently controlled as desired. The manner in which the operation of the clutch engaging apparatus is controlled coordinately with selected speeds and ranges as aforesaid involves the employment of the fulcrum roller 55 for applying an advancing force to the lever 28 at the intermediate profiled portion 56, and in the present embodiment also involves the employment of a setscrew 78 selectively fixed within the radially outer end of the lever 28 for abutment with a hardened force reaction button 79 suitably fixed to the back face of the pressure plate 22. While specific reference is being made to the lever 28 and its associated parts shown in the drawings, this part of the description is equally pertinent to identical constructions associated with the other two levers 28. As the speed of the driving parts of the clutch increases in the rate of rotation about the axis of the shaft 11, and therefore as the centrifugal force of the weight W increases for urging the fulcrum member roller 55 radially inwardly of the clutch, the intermediate portion 56 of the lever will be advanced forwardly or to the left as viewed in Fig. 1 as the roller 55 begins its movement inwardly from the center position A to the center position A' which is occupied by this roller when the clutch is fully engaged. When the roller or fulcrum member 55 reaches the position A' the weight W will have reached a position in which its curved outer edge 81 will abut against the inner periphery of the casing cylindrical wall section 19.

As the advancing movement of the pressure plate 22 commences from the position shown in Fig. 1 virtually no opposition is offered to its advancement. There will be a tendency for the lever 28 to pivot about the point of engagement of its inner end 33 with the pressure receiving member 34, but this pivotal movement is prevented by abutment of the setscrew 78 with the hardened force receiving member 79 on the pressure plate 22. That is, pivotal movement of the lever 28 about the point of its engagement with member 34 at its inner end would involve pivotal movement about the pivot pin 31 since this pin can move only rectilinearly with the pressure plate 22, and the abutment of the setscrew 78 with the force receiving member 79 in preventing counterclockwise rotation of the lever, about the pin 31, necessarily prevents counter-clockwise pivotal movement of said lever about the point of contact of its inner end with the force receiving member 34. Under these circumstances the setscrew 78 in abutting against the force receiving member 79 together with the lever 28 form a means movable bodily with the pressure plate 22 for transferring virtually the entire advancing force applied to the intermediate lever section 56 from the fulcrum member 55 to the right end of the spring 42 through the sleeve 36 and the spring abutment member 44. Therefore, in the initial operating stages in which the clutch engaging apparatus is operated for engaging the clutch, the entire force received from the centrifugal weights is applied to the spring 42 for compressing the same. The lever and its setscrew 78 may be considered as an advanceable structure, and the setscrew in reacting on the back of the pressure plate constitutes constraining means operable, during the preliminary advancement of said structure, to cause the advancing or operating force received from the fulcrum member 55 to be applied solely to the yieldably displaceable means 35—36—42.

In the layout of Figs. 1 to 3 unitary advancement of the pressure plate 22, lever 28 and sleeve 36 occurs until the fulcrum roller is moved radially inwardly of the clutch a distance to contact a profile point as E on said lever before the drive and driven friction elements of the clutch begin to be pressed together with significant force from the pressure plate. Meanwhile, of course, the spring 42 has been partially compressed. This may be termed the "initial" engagement speed for the clutch and may be varied as desired by changing to levers 28 having a certain profile contour CE, assuming the other parts to remain unchanged. Preferably this speed will be as high as is contemplated necessary for engine warmup racing or as is contemplated necessary to enable the vehicle engine to develop additional vehicle starting or "take-off" power in emergencies.

Upon the pressure plate 22 encountering resistance to advancement because of the "initial" engagement of the clutch drive and driven parts the fulcrum roller 55, as it is advanced by the weight W by a further increase of the clutch rotational speed, will cause the intermediate profiled portion of the lever to advance axially forwardly of the clutch at a greater rate than the pressure plate incident to imparting a component of force to the pressure plate through the outer end of the lever. Thus the force of the roller 55 on the lever 28 is divided between the pressure plate and the spring 42 although there is no diminution in the force applied to said spring because the component imparted to the pressure plate is derived from an increment of the fulcrum force. While the setscrew 78 was effective to prevent counterclockwise pivoting of the lever 28 about the pin 31 as viewed in Fig. 1 so the lever moved bodily to transmit virtually all force exerted forwardly thereon to the spring 42 until resistance to forward movement was encountered by the pressure plate, there is no impediment to clockwise pivoting of such lever which takes place when the fulcrum roller 55 advances inwardly beyond the point E on the profile 56. Advancement of the roller 55 inwardly radially of the clutch from point E can occur only upon a further increase in rotational speed of the clutch and though the centrifugal force developed by the weights W is then divided between the two ends of the lever 28, a greater mechanical advantage is given to the roller 55 by so shaping the cam profile section ED' that less forward advancement of the lever profile portion 56 is incurred per unit of inward advancement of said roller. Thus it can be seen in Figs. 1 and 2 that the slope of the tangent to the cam profile at point E to the radial path of movement of the roller 55 is much less than the similarly considered slope of the tangent at the point C when the latter point is in contact with the roller at engine idling speed. Consequently when the roller is at point E in contrast to point C a greater force component can be directed onto the lever profile forwardly of the clutch per unit of force created centrifugally by the weight W. A condition of instability is prevented, however, by the springs 42 and 61 which require more force per unit of distortion as their distortion increases. Nevertheless the contour of cam profile portion ED' is designable to enable the weight W to advance the roller to the fully engaged position D' at an "ultimate" engagement clutch speed exceeding the "initial" engagement speed by any desired margin.

The force applying structure, including the levers 28, in applying components of the advancing force (received from the rollers 55) to the element 22 and to the yieldably displaceable means 35 through respective portions 29 and 33 of this structure, incurs reactionary force complements opposite and equal to said force components and respectively from the element 22 and the yieldably displaceable means 35. The force applying structure in serving its function is operable to apply these reactionary complements of the force applied through said structure portions each against the other.

A method of designing the contour of the profile 56 on the lever 28 is illustrated in Fig. 2a. The centers L, A and A' for the lever pivot 31, the roller 55 in its retracted position and for the roller 55 in its fully advanced position are laid out. Then assuming that it is desired for the roller 55 to encounter a 30 degree slope on the profile 56 as it is initially moved downwardly when the speed of the engine is increased above idling speed, 30 degree angle ($a$) is laid out between a line CL passing through the center A and a line HL passing through the center A and directed perpendicularly to the path of movement of the roller. Assuming further that it is desired for the roller to encounter a slope tangent of something less than 10 degrees when its center is at the position A', a center line DL passing through the point A' will be drawn at an angle ($b$) of 10 degrees. The lines CL and DL are extended to an intersection point P about which point the profile 56 is generated and will extend between the points C and D and perhaps slightly beyond these two points in each direction. As the roller moves downwardly from point A toward point A' it will at first be opposed by a slope on the profile 56 of 30 degrees indicated by the tangent line CL' which is tangent to the arcuate profile 56 at the point C. If the lever 28 did not pivot about the point L as the roller 55 descends or moves radially inwardly of the clutch, the roller, upon reaching the profile point D, would encounter a 10 degree slope as indicated by the tangent line DL' which is tangent to the arcuate profile 56 at the point D. However, as the roller 55 descends it imparts clockwise pivotal movement to the lever 28 about the point L and because of the consequent displacement of the profile 56, by the time the roller 55 reaches its downward limit of movement at the point A' the point D upon the profile 56 will in fact have been displaced a short distance below a point D' which makes the actual contact with the roller 55. A tangent D'L, Fig. 2, to the profile 56 at the point D' describes a slope angle ($d$) of 6.3 degrees with the path of movement of the roller. Thus the slope encountered on the cam profile 56 by the roller 55 continually decreases as it moves downwardly from the point A to the point A' wherefore the mechanical advantage of the roller for advancing the lever profile 56 to the left increases as the roller is advanced downwardly. In other words, as the roller advances downwardly, because of the change or diminution of the slope angle encountered upon the profile a greater force component is exerted upon the profile 56 perpendicularly to the downward path of movement of said roller per unit of force exerted downwardly upon the roller by the speed responsive device.

This mechanical advantage gained by the roller as it moves downwardly because of the change in tangential slope on the cam profile is augmented by a further mechanical advantage gained by the point of contact of the roller shifting lengthwise of the lever from the point of its connection at the pin 31 with the pressure plate 22 toward the point of contact of the inner end of the lever with the pressure receiving member 34. The force applied to the left upon the pressure plate 22 will, of course, be equal to $$\frac{FsLs}{Lp}$$

where $Fs$ equals the force exerted by the lower end of the lever upon the member 34, $Ls$ equals the length of the lever arm between the lower end of the lever and the point of contact of the profile 56 with the roller 55 and $Lp$ equals the length of the lever arm between said point of contact with the roller 55 and the center of the pivot pin 31 at the upper or outer end of the lever.

The above described method of designing the shape of the profile 56 on the lever 28 is somewhat empirical. If the 6.3 degree slope angle (d) in the closed position in Fig. 2 is smaller or larger than proves to be desirable, the angle (b) of the layout in Fig. 2a can be increased or decreased to obtain an angle (d) of the desired magnitude. It will be observed that the smaller the angle (d) the less will be the effect of the force of the compressed spring 42 upon the lower end of the lever 28 intending to cam the roller 55 upwardly or radially outwardly when the speed of the clutch decreases and the centrifugal force of the weights W likewise decreases. If the angle (d) were zero at the time the clutch is fully engaged the spring 42 irrespective of the force applied to the inner or lower end of the lever 28 would be ineffective for camming the roller 55 upwardly. Therefore after engagement of the clutch the only force opposing the centrifugal force of the weights W for retaining the roller 55 in the clutch engaged position would be the spring 61 of the speed responsive device. Consequently the disengaging speed of the clutch may be controlled and caused to be considerably lower than the "initial" engagement speed and in fact if desired, by sufficiently diminishing the angle (d) and decreasing the strength of the springs 61 the speed at which the clutch begins to release from its fully engaged condition can be made as low as desired. By so shaping the weights W that they would not abut the cylindrical wall 19 of the clutch casing, Fig. 3, until the roller 55 had been advanced downwardly for engaging a point such as X, Fig. 2, upon the cam profile 56 the angle (d) would be diminished to zero.

It is not essential that the cam profile 56 be a simple curve as illustrated in Figs. 1, 2 and 2a although, generally speaking, it is desirable for this profile to be shaped so that the slope of a tangent line thereto at progressive points of contact by the roller as this roller moves downwardly will decrease. For example, a point as P upon the line CL, Fig. 2a, could be the point for generation of that part of the profile 56 falling between the points C and E, Fig. 2, and a different point either above or below the point P could be used as a center for the generation of that part of the profile between the points E and D. If this second point were above the point P the rate at which the slope of the profile decreased as the roller advanced downwardly would be greater, and if the point were below the point P the rate at which the slope changes would be less. If the slope changes more rapidly the mechanical advantage of the fulcrum roller will increase more rapidly and thereby narrow the speed band between the "initial" engaging speed for the clutch and the "ultimate" engaging speed therefor. While it is desirable that this speed band should not be too wide it is also essential for it to have sufficient width for the clutch to avoid sudden closure to cause lurching of the vehicle.

By increasing the angle (a) in Fig. 2a and/or by increasing the distance of the point P from the point A the rate of diminution in the slope encountered by the roller in moving from the engine idling position C to the "initial" engagement position E can be decreased and thereby have the tendency to increase the "initial" engagement speed. Although it is convenient to make the profile 56 in the shape of a simple curve, it may be made of any desired contour and the portions CE and ED thereof may be independently designed so as to obtain by means of the profile portion CE an "initial" engagement speed of desired magnitude and thereafter an engaging speed band of the desired breadth.

It is also possible to alter or adjust the slope at the point of contact of the roller 55 with the cam profile 56 with respect to the degree of advancement of the pressure plate 22 or state of engagement of the clutch by changing the axial position of the setscrew 78. For example, rotation of the setscrew 78 for advancing it toward the pressure applying member 79 would cause the lever 28 to assume a position slightly clockwise from that shown in Fig. 1 about the axis of the pin 31 and would, therefore, decrease the slope on the profile 56 encountered by the roller 55 at the successive points of contact as it is advanced downwardly or inwardly of the clutch. This would give the roller 55 a greater mechanical advantage, that is, it would increase the magnitude of the force component forwardly of the clutch for advancing the lever 28 forwardly with respect to the component derived from the speed responsive device for moving the roller downwardly. Rotating the setscrew 78 for adjustment in the opposite direction would have the opposite effect, decreasing the mechanical advantage of the roller 55 and correspondingly increasing the speeds at which "initial" and "ultimate" clutch engagement occur.

After the clutch has become fully engaged, should it be desired to manually disengage the clutch this may be accomplished by manual rotation of the lever 49 by conventional means (not shown) operated by a pedal and for moving the throwout bearing 48 forwardly or to the left as viewed in Fig. 1 and thereby relieving the reactive force applied to the lower end of the lever 28 by the spring.

Embodiment in Figs. 4 and 5

In that form of the invention shown in Figs. 4 and 5 the drive shaft 101 which is hollow is driven from its right end as viewed in Fig. 4 and has splined thereto at 102 a sleeve 103 having a flange 104 secured by means of a plurality of bolts 105 (one being shown) to a flywheel 106. This flywheel carries speed responsive mechanism which may be in the form of that illustrated in Fig. 3 and which has a roller 55′ corresponding to the roller 55 which upon an increase in speed of the drive shaft and flywheel is moved inwardly of the clutch, downwardly as viewed in Fig. 4, from a center A to a center A'.

The bolts 105 also secure a drum 107 to the flange 104, this drum having a plurality of axially extending splines or ribs 108 for slidable meshing with notches 109 upon the inner periphery of a clutch driving disk 110 and with splines 111 and 112 upon the inner periphery of annular pressure plates 113 and 22'. All reference numerals designated with a prime in this second embodiment respectively correspond to the same reference numeral in the first embodiment and designate corresponding parts. The pressure plate 113 is a reaction pressure plate held against forward movement or to the left as viewed in Fig. 4 by a large nut 114 screwed on to the left end of the drum 107. The pressure plate 22' is axially slidable upon the drum 107 under the influence of the clutch engaging lever 28', the speed responsive actuated roller 55' and a helical spring 42' disposed about the sleeve 103.

Annular driven disks 115 of the clutch are splined about their outer peripheries at 116 to the inner periphery of a ring 117 secured by bolts 118 to a driven bell 119 which in turn is secured by bolts 121 to a driven shaft 122.

Said bell 119 has a re-entrant hub portion 123 carried upon axially spaced ball bearing units 124 and 125 upon the sleeve 103. A spacer sleeve 126 maintains the bearing units 124 and 125 axially apart and cooperates with a ring 127 and a shoulder 128 on the sleeve 103 for determining the positions of the bearing units 124 and 125 axially of the sleeve 103, and a sleeve nut 129 threaded onto the left end of the drive shaft 101 abuts against the inner race of the bearing unit 124 for maintaining the desired assembly of said bearing unit.

A plurality of openings 131 are provided circumferentially of the clutch drum 107, there being an opening 131 for each of the three clutch operating levers 28' and each being for receiving the inner end of its associated lever as illustrated in Fig. 4. A flanged sleeve member 132 is disposed between the inner ends of these levers and the right end of the spring 42' to enable the levers to apply a compressing force to the spring.

In addition to receiving the inner ends of the clutch actuating levers 28', the openings 131 in the clutch driving drum 107 receive outwardly projecting bosses 133 upon a ring 134 disposed within the drum 107 in coaxial relation with the drive and driven shafts 101 and 122. A second ring 135 pressed into shape from sheet metal is secured to the ring 134 by circumferentially spaced bolts 136. The right end of the ring 135 has an inwardly directed flange 137 which axially overlies the flange on the member 132. Three notches 138 circumferentially spaced in the right end of the ring 135 are for respectively receiving the inner ends of the levers 28' in the manner illustrated in Fig. 5 when the clutch is engaged. The ring structure 134—135, like the composite structure of the adjusting screws 78 in the levers 28 in Fig. 1, forms a means for transmitting virtually the entire operating force of the fulcrum member 55' to the spring 42' while causing bodily movement of the levers 28' until such time as the free space is taken up between the clutch plates and the "initial" engagement of the clutch begins.

In Fig. 4 the clutch and the mechanism including the levers 28' and the rollers 55' are shown in the position occupied when the drive shaft 101 and the speed responsive mechanism subject to the speed thereof are operated at a speed not exceeding engine idling speed. Upon an increase in speed above engine idling speed the roller 55' will be caused to move downwardly in a path perpendicularly to the axis of the drive shaft 101. Thus the roller 55' imposes a force component upon the lever profile section 56' in a forward direction or perpendicularly to the path of movement of the roller, whereby the lever 28' (as well as the other two levers, not shown, which are correspondingly associated with their rollers 55') is moved to the left as viewed in Fig. 4. This movement to the left or forwardly imposes a forward force through the pivot pin 31' to the pressure plate 22' and through the lugs or splines 112 on the inner periphery of this pressure plate and the lugs 133 on the outer periphery of the ring structure 134—135 for advancing the flange 137 of this ring structure and the spring capping member 132 whereby the inner end of the lever 28' can move forwardly with its outer end, incurring bodily movement of said lever and causing the entire forward force component applied to the lever from the fulcrum roller 55' to be imposed axially upon the spring 42' for compressing this spring. Since the ring 135 and the spring capping member 132 are advanced together as the spring 42' is compressed, the inner end of the lever 28' does not at this time move forwardly into the associated notch 138 in the ring 135.

The slope of the profile 56' is a determining factor in the speed required for the speed responsive device to incur sufficient force for taking up the slack between the clutch driving and driven elements 110, 115, 113 and 22' or to incur the "initial" engaging speed for the clutch. In this form of the invention the profile 56' is perfectly straight in contrast to the curved profile 56 upon the lever 28 in the first embodiment. Subsequent to the advancement of the pressure applying element 22' to the "initial" engaging position of the clutch the upper end of the lever 28' can no longer move forwardly to any substantial degree (the amount being determined by the compressibility of the friction facings F on the clutch elements 22', 115 and 113) and with this virtual termination of the advancement of the element 22', the ring structure 134—135 will virtually cease in its forward advancement so that additional inward movement of the fulcrum roller 55' in moving the intermediate section 56' of the lever 28' forwardly, will cause this lever to pivot about the axis of the pivot pin 31' while compressing the spring 42' and dividing the forward force component applied to the lever 28' between the pressure plate and the spring. The ratio in the division of this forward force component between the spring and the pressure plate is inversely to the distance radially of the clutch between the point of contact of the inner end of the lever 28' with the spring capping member 132 and the point of contact of the roller with the profile 56' and the distance similarly taken between this point of contact and the axis of the pivot pin 31'. Thus as in the first embodiment the profile 56' of the lever 28' is operable by the contour between a starting point C and an "initial" clutch engaging point E to predetermine the speed at which initial engagement of the clutch occurs and operable by virtue of the contour of the profile section ED' to predetermine the width of the speed band between the initially engaging speed and the ultimately engaging speed.

Embodiment in Figs. 6 to 10

In Figs. 6 to 10 the reference characters provided with the double prime signify parts corresponding to those designated by the same reference character without the double prime in the first embodiment of the invention.

The clutch with which the invention is associated is installed between a drive shaft 201 and a driven shaft 202 which shafts are coaxial. A hub 203 on the driven shaft has splines 204 upon which a pair of driven friction elements 205 are mounted. Between the annular elements 205 is a driving friction element 206 and upon the outer sides of the elements 205 is a fixed reaction friction element 207 and an axially movable pressure plate 22''. These elements 207, 206 and 22'' are splined at 208 to the inner cylindrical periphery of a drum 209 attached to a wall of and forming part of a clutch housing 16''. The housing 16'' is connected by circumferentially spaced bolts 14'' to the drive shaft 201 and the drum part 209 of the housing 16'' is journalled upon the driven shaft 202 by a ball bearing unit 211. A journalled support between the driven shaft and the drive shaft and the right end of the clutch housing 16'' is provided by a ball bearing unit 212.

An annular oil guard plate 213 is secured to the driven shaft 202 by one or more screws 214 and it is the purpose of this plate to prevent the throwing and splashing of oil which may accumulate in the casing 16'' upon the clutch friction elements 205, 206, etc. During rotation of the clutch the guard member 213 prevents splashing of oil onto the hub 203 from which it would be centrifugally thrown outwardly where it would accumulate on the friction elements, and when the clutch is at rest oil which may have accumulated upon the inner periphery of the cylindrical wall 19'' in dropping downwardly by the force of gravity will drop onto an annular guard ring 215 which overlies the guard plate 213 in a radial sense wherefore any oil dropping downwardly from the edge 216 of the ring 215 will fall forwardly or to the right of the plate 213. Any oil accumulating within the inner periphery of the ring 215 during rotation of the clutch will be thrown outwardly through small circumferentially spaced holes 217.

In Fig. 10 it can be seen that in the modified form of speed responsive device employed in this form of the invention the weights W'' have hubs 58a'' at one end where they are pivoted upon pins 58'' anchored in the clutch casing front wall 59''. This places the rollers 55'' and 69'' on the same side of the pivot point at the axis of each pin 58'' as the associated weight W'', thereby making the mass of the rollers 55'' and 69'' and their associated parts operative cumulatively with the mass of the weights W'', reducing the mass necessary for the weights and hence diminishing the weight of the clutch.

A further expedient employed for diminishing the required mass of the weights W'' is the employment of successively operable spring groups for resisting advancement of the outer ends of the clutch controlling lever to the left as viewed in Fig. 6. Two groups of springs are used in conjunction with each of the three levers 28''. One of these spring group assemblies is illustrated in Fig. 8 where the springs in one group are designated 221 and those in the second group 222. Bosses 223 are anchored in the rear wall of the clutch housing 19'' for retaining the rear ends of the springs 221 in position while bosses 224 are fastened in one flange of an angle piece 225, Figs. 6, 7 and 8, for retaining the opposite ends of these springs 221. A mid portion of the angle piece 225 is acted upon by the upper end of the associated lever 28''. The second set of springs 222 are carried about bolts 226 secured by means of threaded reduced diameter portions 227 in the front casing back wall and having cylindrical heads 228 freely slidable within holes 229 in the angle piece 225. These springs 222 are held under compression by means of washers 231 which react against the bolt heads. The springs 221 are likewise installed under a slight pressure, and cotter keys 232 in the bolt heads 228 prevent the accidental movement of the angle member 225 axially off of these heads when their associated lever 28'' is removed.

The operation of this third embodiment of the invention is generally the same as that of the first embodiment. With the clutch disengaged and hence with the parts in the positions illustrated in Fig. 6 while the drive shaft 201 is at rest or rotating at a slow speed the weights W'' will be in their radial inward position as illustrated in Fig. 10. As the speed of the shaft 201 is increased the weights W'' will move outwardly carrying with them the rollers 55'' which roll along the profiles 56'' of their respective levers 28''. Because of the contact of the setscrews 78'' with the bearing members 79'' in the pressure plate 22'' the reactive force applied to the right upon the outer ends of the levers 28'' cannot cause the levers 28'' to pivot about the pins 31'' in the direction which would carry the setscrews nearer to the pressure plate. Consequently until such time as the pressure plate is advanced through a preliminary movement in which the spaces are closed between the friction elements 205, 206, etc., the levers 28'' will be advanced by the rollers 55'' bodily to the left. Substantially coincidentally with the completion of this preliminary movement the angle members 225 at the outer ends of the levers 28'' will contact the washers 231, which are slidable axially of the bolts 226, so that further advancement of the levers 28'' will need to overcome the resistance of both groups of springs. And as in the first embodiment, after the pressure plate is opposed in its advance by the contact of the friction elements 205, 206, etc., further advancement of the intermediate sections of the levers by the operating force received from the rollers 55'' will necessarily cause the levers to pivot about their pins 31'' incident to compression of the springs 221 and 222. Meanwhile the slope encountered by the rollers 55'' upon the profiles 56'' of the levers will change according to the design, to provide for sufficient mechanical advantage for the rollers to advance to the "ultimately" engaged position of the clutch at the desired speed.

By employing a first group of springs 221 for opposing advancement of the levers 28'' in opposition to the force developed by the speed responsive device until the "initial" clutch engaging speed is attained, smaller weights or a lighter speed responsive device may be used. However, since the operating force applied to the intermediate portions of the levers is differentially applied between the pressure plate and the springs at the outer ends of the levers when the clutch is "ultimately" engaged, the force applied to the friction disks by the pressure plate and hence the rated capacity of the clutch is dependent upon the force or combined strength of the springs at the outer ends of the levers. Hence while it is possible to use light springs in combination with correspondingly lighter inertia weights W'' in determining the "initial" engaging speed of the clutch, it is essential that stronger spring force be available at the outer ends of the levers to obtain the desired load capacity of the clutch without adding to its weight by the addition of more friction elements. The system herein employed using first the single group of springs and later the combined force of two groups of springs is feasible because in the higher speeds at which the second group of springs comes into operation the force at which the speed responsive device is capable of developing will be much greater since the developed force increases as the square of the speed. Also, the force required of the centrifugal device can be modified as desired by design of the profile 56''.

Uniformity in the rate of advancement of the levers 28'' under the force received from the rollers 56'', though the outer flanges of the angle members 225 are pressed by centrifugal force against the inner periphery of the clutch casing wall 19'' is improved by the employment of bronze rib-like bearing members 235, Fig. 10, for sliding upon the steel casing wall 19''.

The uniformity of the engagement rate in operation of the clutch is also enhanced by the use of one or more cupped annular friction elements 205 or 206. In the present form the driving friction element 206 is slightly cupped in the fashion illustrated with exaggeration in Fig. 9. As the friction elements 205 are pressed together upon opposite sides of the element 206, one of the elements 205 will first engage the element 206 near its outer edge while the other element 205 will first engage the element 206 adjacently to its inner edge, and as the pressure increases, the contact of the first element 205 will creep radially inwardly while the area of contact of the other element 205 will creep radially outwardly until the clutch is engaged to the desired degree.

Figure 11:
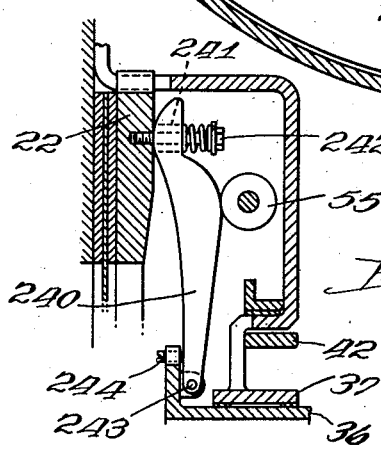
Fig. 11 is a side elevational view of a modified clutch actuating lever, showing the manner in which it is installed.

If desired, the means for limiting the forward movement of the lever intermediate portions relatively to their end associated with the yieldably displaceable means can take the form shown in Fig. 11. Here the outer ends of levers 240, corresponding to the levers 28 in Fig. 1, are curved to slide easily on the back side of the pressure plate, and to facilitate such sliding an oversize opening 241 is formed in each lever to receive a respective bolt 242 anchored in the pressure plate. These levers are pivoted at their inner ends on pins 243 carried on the sleeve 36. Forward movement of the levers is limited by setscrews 244 which serve the function of the setscrews 78 in Fig. 1.

While I have herein shown and described a limited number of embodiments which are thought adequate for clearly disclosing the invention, it should be understood that the invention is not limited to this specific disclosure but comprehends other constructions, arrangements of parts and details falling within the spirit thereof.

I claim:

1. In a clutch, a clutch engaging element to which an enabling force is appliable to establish a power transmitting condition of the clutch, yieldably displaceable means, a force applying structure having a force receiving portion and force applying portions, said structure being advanceable by an operating force applied to said force receiving portion and including constraining means operable to constrain said structure pursuant to a preliminary part of such advancement to impose virtually the entire operating force through one of said force applying portions onto the yieldably displaceable means while displacing the same, the other of said force applying portions of the structure being associated with said clutch engaging element and opposed thereby to further advancement upon the execution of said preliminary part of the advancement to incur the application of components of said operating force differentially respectively to said displaceable means and said clutch engaging element and thus create said enabling force for said element, said element and said displaceable means incurring reactionary force complements respectively against said force applying portions in opposition to said force components, and said structure being operable to apply said force complements each in opposition to the other.

2. In a clutch comprising an element advanceable into a pressure applying position for creating a force transmitting condition of the clutch, yieldably displaceable means, a bodily advanceable lever having opposite portions respectively advanceable to apply an advancing force to said element and a displaceable force to said displaceable means and an intermediate portion for the reception of an operating force, a fulcrum member operable to apply said operating force to said intermediate member portion, means for transmitting virtually the entire operating force of the fulcrum member to said yieldably displaceable means while causing bodily movement of said lever and while displacing said yieldable means until the force applying position of said element is reached, and said lever being thereafter operable to divide said operating force of said fulcrum member between said element and said displaceable means.

3. In a clutch, drive and driven parts, an element advanceable into a pressure applying position for establishing a force transmitting relation between said parts, a bodily advanceable lever of which one end portion is in force applying relation with said element to advance the same when such lever end portion is advanced, yieldable means yieldably opposing advancement of the opposite end portion of such lever to cause such advancement of the one lever end portion when a lever advancing force is applied to an intermediate portion of the lever, fulcrum means disposed at such intermediate portion of the lever and operable to apply such lever advancing force thereto, and means reactable against said element for transmitting force to said yieldable means to cause yielding thereof as a function of the advancement of said element to incur bodily advancement of said lever by the force received from the fulcrum means until the element reaches said pressure applying position, and said fulcrum being further advanceable subsequent to the element reaching said pressure applying position to apply such pressure through said one lever end portion while advancing the opposite lever end portion in opposition to said yieldable means.

4. In a clutch having driving and driven parts, an element advanceable for establishing a driving relation between said parts, a lever having an end portion in force applying relation with said element for advancing the same, means yieldably opposing advancement of an opposite end portion of the lever in the direction of advancement of said element, fulcrum means for applying force to an intermediate section of said lever in the direction of such advancement, means preventing pivotal movement of said lever about said fulcrum means in the direction that would cause said other end portion to lag the intermediate section to cause unitary movement of said element and said lever in opposition to the force of said yieldably opposing means, and means for shifting said fulcrum means along said lever toward said other end portion as the lever and element are advanced.

5. In a clutch including a pressure element and drive and driven parts between which a power transmitting relation is established upon the application of a pressure applying force to said element; the combination of yieldably displaceable means, and an advanceable force applying structure receivable of an advancing force for advancing the same, said structure having a portion through which said pressure applying force is appliable to said pressure element, said advanceable structure including means operable during a preliminary advancement thereof to cause application of said advancing force solely to said yieldably displaceable means for causing the latter to oppose said preliminary advancement and thus constitute a factor in determining the magnitude of said advancing force required to effect said preliminary advancement, said structure being operable to apply said advancing force through said portions respectively to said displaceable means and to said pressure element upon further advancement of said structure following said preliminary advancement, and said structure being further operable to apply the reactionary complements of the forces applied through said structure portions each against the other.

6. In a clutch including a pressure element and drive and driven parts between which a power transmitting relation is established upon the application of a pressure applying force to said element; the combination of yieldably displaceable means, and an advanceable force applying structure receivable of an advancing force for advancing the same, said structure having a portion through which said pressure applying force is appliable to said element after a preliminary advancement of said structure and having a second portion through which said advancing force is applied to said yieldably displaceable means for causing the latter to oppose said preliminary advancement, said structure being operable to apply said advancing force through said portions respectively to said yieldably displaceable means and to said pressure element upon further advancement of the structure following its preliminary advancement, and said structure being further operable to apply the reactionary complements of the forces applied through said structure portions each against the other, and additional yieldably advanceable means operable during said further advancement to increase the opposition to the advancement of the second structure portion.

7. In a clutch including a pressure element and drive and driven parts between which a power transmitting relation is established upon the application of a pressure applying force to said element; the combination of yieldably displaceable means, and an advanceable force applying structure having a force receiving portion receivable of an advancing force for advancing the same, said structure also having a first pressure applying portion through which a part of said advancing force is applied to said element as said pressure applying force after a preliminary advancement of said structure and a second pressure applying portion through which said advancing force is applied to said yieldably displaceable means for causing the latter to yieldably oppose said preliminary advancement, said structure being operable to differentially apply said advancing force through said pressure applying portions to said yieldably displaceable means and to said pressure element upon further advancement of the structure following its preliminary advancement, and pressure exerting means operable to exert said advancing force on said force receiving portion, and said pressure exerting means also being movable relatively to said force receiving portion to change the ratio of the forces differentially applied through the pressure applying portions.

8. In a clutch including a pressure element and a drive and driven parts between which a power transmitting relation is established upon the application of a pressure applying force to said element; the combination of yieldably displaceable means, and an advanceable force applying structure having a force receiving portion receivable of an advancing force for advancing the same, said structure also having a first pressure applying portion through which a part of said advancing force is applied to said element as said pressure applying force after a preliminary advancement of said structure and a second pressure applying portion through which said advancing force is applied to said yieldably displaceable means for causing the latter to yieldably oppose said preliminary advancement, said structure being operable to differentially apply said advancing force through said pressure applying portions to said yieldably displaceable means and to said pressure element upon further advancement of the structure following its preliminary advancement, and means including a forcibly advanceable member receivable of an actuating force to move the same for causing such means to apply said advancing force to said force receiving portion of the advanceable structure in a magnitude increasing with respect to said actuating force as the forcibly advanceable member is advanced.

9. In a clutch including a pressure element and drive and driven parts between which a power transmitting relation is established upon the application of a pressure applying force to said element; the combination of yieldably displaceable means, and an advanceable force applying structure having a force receiving profile receivable of an advancing force for advancing the same, said structure also having a first pressure applying portion through which a part of said advancing force is applied as said pressure applying force to said element after a preliminary advancement of said structure and a second pressure applying portion through which said advancing force is applied to said yieldably displaceable means for displacing the same and thus causing the latter to yieldably oppose said preliminary advancement, said structure being operable to differentially apply said advancing force through said pressure applying portions to said yieldably displaceable means and to said pressure element upon further advancement of the structure following its preliminary advancement, said structure being further operable to vary the ratio of the differentially applied forces with a change in the point upon said profile at which the advancing force is received, and means including a forcibly advanceable member receivable of an actuating force to advance such member along said profile while imparting said advancing force thereto with an increasing magnitude with respect to said actuating force.

10. In a clutch including a pressure element operable responsively to the application of a pressure applying force thereto to establish a power transmitting condition of said clutch; the combination of yieldably displaceable means, a force applying structure advanceable by an advancing force received upon a force receiving profile thereof, said structure having a first pressure applying portion through which a part of said advancing force is applied in the character of said pressure applying force to said element after a preliminary advancement of said structure and a second pressure applying portion through which said advancing force is applied to said yieldably displaceable means for displacing the same and thus causing it to yieldably oppose said preliminary advancement, said structure being operable to differentially apply said advancing force through said portions to said displaceable means and to said element upon a further advancement, said structure being further operable to vary the ratio of the differentially applied forces with a change in the point upon said profile at which the advancing force is received, and means including a roller forcibly advanceable along said profile by an actuating force while imparting said advancing force to said profile in a magnitude increasing pursuant to and at a greater rate than an increase in said actuating force.

11. In a clutch including a pressure element operable responsively to the application of a pressure applying force thereto to establish a power transmitting condition of said clutch; the combination of yieldably displaceable means, a force applying structure advanceable by an advancing force received upon a force receiving profile thereof, said structure having a first pressure applying portion through which a part of said advancing force is applied in the character of said pressure applying force to said element after a preliminary advancement of said structure and a second pressure applying portion through which said advancing force is applied to said yieldably displaceable means for displacing the same and thus causing it to yieldably oppose said preliminary advancement, said structure being operable to differentially apply said advancing force through said portions to said displaceable means and to said element upon a further advancement, said structure being further operable to increase the ratio of the force applied through the second force applying portion to the advanceable means with respect to that applied through the first portion to said element with an advancement along said profile of the point at which said advancing force is received, and means including a roller forcibly advanceable along said profile by an actuating force while imparting said advancing force to said profile in a magnitude increasing pursuant to and at a greater rate than an increase in said actuating force.

12. In a clutch including a pressure element and drive and driven parts between which a power transmitting relation is established upon the application of a pressure applying force to said element; the combination of yieldably displaceable means, an advanceable force applying structure, speed responsive means operable to apply an advancing force to said structure as a direct function of the speed of the clutch drive member, said structure having a portion through which said pressure applying force is appliable to said pressure element after a preliminary advancement of said structure and having another portion through which said advancing force is transmitted to said yieldably displaceable means for incurring yielding opposition thereby to said preliminary advancement and determine the speed of its completion, said structure being operable to apply said advancing force of the speed responsive means through said portions upon further advancement of said structure following the completion of said preliminary advancement, and said structure being further operable to apply the reactionary complements of the forces applied through said structure portions each against the other.

13. In a clutch including a pressure element operable responsively to the application of a pressure applying force thereto to establish a power transmitting condition between rotatable drive and driven parts of said clutch; the combination of a yieldably displaceable means, a force applying structure advanceable by an advancing force received upon a force receiving profile thereof, and speed responsive means including a roller and operable under the influence of an actuating force increasing with the rotative speed of said drive part to advance said roller along said profile in a course convergent therewith while imparting said advancing force thereto from the roller, said structure having a first pressure applying portion through which a part of the advancing force is applied in the character of said pressure applying force to said element during a further advancement of the structure following a preliminary advancement thereof, said structure having a second pressure applying portion through which said advancing force is applied to said yieldably displaceable means for displacing the same and thus causing it to yieldingly oppose said preliminary advancement for determining the drive part speed required to commence the further advancement of said structure, and said structure being operable to differentially apply said advancing force through said portions to said displaceable means and to said pressure element pursuant to said further advancement of the structure.

14. The combination set forth in claim 13, wherein the degree of convergence of said profile with the course of said roller decreases as the roller is advanced along said profile, to correspondingly increase the ratio of said advancing force to said actuating force.

15. The combination set forth in claim 13, wherein said profile of the advanceable structure is contoured to predeterminedly change the slope encountered at successive points thereon by said roller as it is advanced through said course.

16. The combination set forth in claim 13, wherein there is an additional yieldably advanceable means disposed for yieldably opposing advancement of said second pressure applying portion during said further advancement of said structure, to increase the force differentially appliable to said element through the first pressure applying portion per unit of advancement of said structure.

17. In a clutch having drive and driven parts and an element pressable for establishing a driving relation between said parts; the combination of a yieldably displaceable element, a lever having spaced force applying portions and also having an intermediate portion receivable of an advancing force for advancing the lever, one of said force applying portions being disposed for applying a displacing force to the displaceable element when said portion is advanced, the other of said spaced force applying portions being disposed for applying a pressing force to the pressable element upon a further advancement of the lever following a preliminary advancement thereof, said lever being pivotable relatively to said elements at the force applying portions respectively associated therewith during said further advancement so the lever differentially applies said displacing and pressing forces thereto, and means reactable between the lever and one of said elements to limit advancement of the intermediate lever portion relatively to the one force applying portion to incur bodily advancement of the lever and transmittal of the advancing force from the intermediate lever portion to the displaceable element through said other force applying portion during said preliminary advancement.

18. In a clutch having drive and driven parts and an element pressable for establishing a driving relation between said parts subsequent to an initial advancement; the combination of a yieldably displaceable element, a structure having spaced force applying portions and also having an intermediate portion receivable of an advancing force for advancing said structure, one of said force applying portions being in displacing force applying association with the displaceable element to displace the same when such portion is advanced, the other of said spaced force applying portions being in force applying association with the pressable element for imparting the initial advancement thereto during a preliminary advancement of the structure and for applying a pressing force thereto upon a further advancement of the structure, said structure being tiltable relatively to said elements at the force applying portions respectively associated therewith during said further advancement for causing the structure to differentially apply said displacing and pressing forces thereto, and means advanceable with said pressable element for displacing the displaceable element therewith during said initial advancement of said pressable element to coact with said one force applying portion of said structure in imposing the entire advancing force on the displaceable element during the preliminary advancement of said structure.

19. In a clutch having drive and driven parts and a pressure plate pressable for establishing a driving relation between said parts by a further advancement subsequent to an initial advancement, the combination of radial clutch actuating levers having end portions associated with said pressure plate and advanceable for applying a pressing force thereto to effect the initial and further advancements thereof, yieldably displaceable means, the opposite end portions of said levers being associated with said yieldably displaceable means and advanceable for applying a displacing force thereto for displacing the same, said levers also having intermediate portions with profiles receivable of an advancing force for advancing them, said levers being tiltable relatively to said pressure plate and to said yieldably displaceable means at said end portions during said further advancement for causing the levers to differentially apply said pressing and displacing forces thereto, tilting limiting means reactable upon said levers to limit advancement of their intermediate portions relatively to their said other end portions associated with the yieldably displaceable means so the levers are operable to transmit the advancing force to said yieldably displaceable means to displace the same during the initial advancement, lever displacing means comprising members advanceable along said lever profiles in courses converging therewith, and said tilting limiting means being settable to change the tilting of said levers and the slope of said profiles to the courses of said lever advancing means.

20. In a clutch having rotatable drive and driven parts and a pressure plate advanceable by a pressing force which subsequent to an initial advancement of the pressure plate causes a further advancement thereof to establish a driving relation between said parts; the combination of radial clutch actuating levers of which each has radially spaced portions, one of such portions of each lever being associated with the pressure plate and advanceable for applying such pressing force thereto to effect the initial and further advancements thereof, yieldably advanceable means having first and second stages of displacement of which the second possesses greater resistance to displacement, the other portion of each lever being associated with said yieldably displaceable means and advanceable for applying a displacing force thereto, each lever also having a profile between its said spaced portions and receivable of an advancing force for advancing said profile and spaced portions, said levers being tiltable relatively to the pressure plate and to said displaceable means at the portions associated therewith during said further advancement of said pressure plate for causing the levers to differentially apply said pressing and displacing forces thereto, tilting limiting means reactable upon said levers to limit advancement of their profiles relatively to their said other portions associated with the yieldably displaceable means so the levers are operable to transmit the advancing force to the yieldably displaceable means during the initial advancement of the pressure plate, lever advancing means comprising members advanceable along said profiles in courses converging therewith to impart the lever advancing force thereto, and said other of the spaced lever portions being resisted in advancement by the second stage resistance of the displaceable means concurrently with the further advancement of the pressure plate.

21. In a clutch having rotatable drive and driven parts and a pressure plate advanceable by a pressing force which subsequent to an initial advancement of the pressure plate causes a further advancement thereof to establish a driving relation between said parts; the combination of radial clutch actuating levers of which each has radially spaced portions, one of such portions of each lever being associated with the pressure plate and advanceable for applying such pressing force thereto to effect the initial and further advancements thereof, yieldably displaceable means having first and second stages of displacement of which the second possesses greater resistance to displacement, the other portion of each lever being associated with said yieldably displaceable means and advanceable for applying a displacing force thereto, each lever also having a profile between its said spaced portions and receivable of an advancing force for advancing said profile and spaced portions, said levers being tiltable relatively to the pressure plate and to said displaceable means at the portions associated therewith during said further advancement of said pressure plate for causing the levers to differentially apply said pressing and displacing forces thereto, tilting limiting means reactable upon said levers to limit advancement of their profiles relatively to their said other portions associated with the yieldably displaceable means so the levers are operable to transmit the advancing force to the yieldably displaceable means during the initial advancement of the pressure plate, and speed responsive means comprising fulcrum members movable along said profiles by an actuating force responsive to the rotative speed of the clutch drive part and in converging relation with said profiles to impart the advancing force thereto, said fulcrum members being thus moved from the one lever portions toward said other lever portions and serving to tilt the levers about the one lever portions to decrease the profile slope encountered by the fulcrum members during said further advancement of the pressure plate and thereby increase the ratio of the advancing force imparted to said profiles per unit of movement of the fulcrum members, and said other of the spaced lever portions being resisted in advancement by the second stage resistance of the displaceable means concurrently with the further advancement of the pressure plate.

22. In a clutch having rotatable drive and driven parts, a pressure plate advanceable by a pressing force which subsequent to an initial advancement of the pressure plate causes a further advancement thereof to establish a driving relation between said parts, and a casing wall disposed rearwardly of said pressure plate and rotatable with said drive part; the combination of radial clutch actuating levers of which each has radially spaced portions, one of such portions of each lever being associated with the pressure plate and advanceable for applying such pressing force thereto to effect the initial and further advancements thereof, yieldably displaceable means, the other portion of each lever being associated with said yieldably displaceable means and advanceable for applying a displacing force thereto, each lever also having a profile between its said spaced portions and receivable of an advancing force for advancing said profile and spaced portions, said levers being tiltable relatively to the pressure plate and to said displaceable means at the portions associated therewith during said further advancement of said pressure plate for causing the levers to differentially apply said pressing and displacing forces thereto, tilting limiting means reactable upon said levers to limit advancement of their profiles relatively to their said other portions associated with the yieldably displaceable means so the levers are operable to transmit the advancing force to the yieldably displaceable means during the initial advancement of the pressure plate, and speed responsive means comprising arms pivoted upon said casing wall, centrifugal weights on said arms to move radially outwardly of the clutch and pivot said arms pursuant to an increase in the rotative speed of the drive part, and fulcrum members on sections of said arms between their pivots and their weights, said fulcrum members being respectively movable along the lever profiles in converging relation therewith to impart the advancing force thereto when the arms are so pivoted, said fulcrum members being thus moved from the one lever portions toward said other lever portions and serving to tilt the levers about the one lever portions to decrease the profile slope encountered by the fulcrum members during said further advancement of the pressure plate and thereby increase the ratio of the advancing force imparted to said profiles per unit of movement of the fulcrum members.

23. In a clutch having rotatable drive and driven parts and a pressure plate advanceable by a pressing force which subsequent to an initial advancement of the pressure plate causes a further advancement thereof to establish a driving relation between said parts; the combination of clutch actuating levers extending radially inwardly from said pressure plate and each lever having radially spaced outer and inner portions, the outer of such portions being associated with the pressure plate for applying said pressing force thereto to effect the initial and further advancements thereof, spring means compressible axially of the clutch in the direction of pressure plate advancement, the inner portions of said levers being associated with said spring means and advanceable to apply a compressing force thereto for compressing the same, each lever also having an intermediate portion between its inner and outer portions and receivable of an advancing force for advancing all of its portions, said levers being tiltable relatively to the pressure plate and to said spring means at the outer and inner lever portions during the further pressure plate advancement for causing the levers to differentially apply the advancing force received at their intermediate portions as the pressing and compressing forces, tilting limiting means reactable upon said levers to limit advancement of their intermediate portions relatively to their inner portions so the levers are operable to transmit said advancing force to said spring means during the initial advancement of the pressure plate, and means manually operable to compress said spring means to diminish said compressing and pressing forces to disestablish the driving relation between the clutch parts.

24. In a clutch having rotatable drive and driven parts and a pressure plate advanceable by a pressing force which subsequent to an initial advancement of the pressure plate causes a further advancement thereof to establish a driving relation between said parts; the combination of clutch actuating levers extending radially inwardly from said pressure plate and each lever having radially spaced outer and inner portions, the outer portions of such levers being associated with the pressure plate for applying said pressing force thereto to effect the initial and further advancements thereof, spring means compressible axially of the clutch in the direction of pressure plate advancement, the inner portions of said levers being associated with said spring means and advanceable to apply a compressing force thereto for compressing the same, each lever also having an intermediate portion between its inner and outer portions and receivable of an advancing force for advancing all of its portions, said levers being tiltable relatively to the pressure plate and to said spring means at the outer and inner lever portions during the further pressure plate advancement for causing the levers to differentially apply the advancing force received at their intermediate portions as the pressing and compressing forces, and spring compressing means comprising a ring-like structure connected with the pressure plate for advancement therewith and also connected with said spring means to compress the same when advanced during the initial advancement of the pressure plate, to cooperate with said levers in transmitting virtually the entire advancing force to the spring means and thwart the differential force applying character of the levers during the initial advancement of the pressure plates.

25. In a clutch having rotatable drive and driven parts and a pressure plate advanceable by a pressing force which subsequent to an initial advancement of the pressure plate causes a further advancement thereof to establish a driving relation between said parts; the combination of clutch actuating levers extending radially outwardly from said pressure plate and each lever having inner and outer portions spaced radially of the clutch, the inner of such lever portions being associated with the pressure plate for applying said pressing force thereto to effect the initial and further advancement thereof, spring means disposed radially outwardly of said pressure plate and yieldably displaceable axially of the clutch in the direction of pressure plate advancement and in first and second stages of resistance of which the second is greater, the outer lever portions being associated with said spring means and advanceable to apply a displacing force thereto for displacing the same, each lever also having an intermediate portion between its inner and outer portions and receivable of an advancing force for advancing all of its portions, said levers being tiltable relatively to the pressure plate and to said spring means respectively at the inner and outer lever portions during the further pressure plate advancement for causing the levers to differentially apply the advancing force received at their intermediate portions as said pressing and displacing forces, and tilting limiting means reactable upon said levers to limit advancement of their intermediate portions relatively to their outer portions so said levers are operable to transmit virtually the entire advancing force as the displacing force to the spring means during the initial advancement of the pressure plate, and the spring means being operable to oppose advancement of the outer lever portions by the second resistance stage concurrently with the further advancement of the pressure plate.

26. The combination set forth in claim 25, wherein there are fulcrum members advanceable by an actuating force to apply said advancing force to the lever intermediate portions in a magnitude increasing in ratio to the actuating force as said fulcrum members are advanced, and means for imparting said actuating force to the fulcrum members in accordance with the speed of the clutch drive part.

27. In a clutch, concentric drive and driven parts, a set of annular drive friction plates on the drive part, a set of annular driven friction plates on the driven part and meshed with the drive plates so that a driving relation is established between the drive and driven parts when the plates are pressed axially together, a pressure plate advanceable axially of said friction plates to press them together, yieldably displaceable means, an advanceable pressure applying structure receivable of an operating force for advancing the same and having spaced force applying portions through one of which a displacing force is appliable to said displaceable means when the structure is advanced and through another of which portions a pressing force is appliable to the pressure plate for pressing the friction plates together during a further advancement of said structure following a preliminary advancement thereof, said structure being operable during said preliminary advancement to transmit virtually the entire operating force to the displaceable means and being operable during the further advancement to divide the operating force differentially between the displaceable means and said pressure plate in the form of said displacing and pressing forces, and one of said friction plates being cupped to cause the area of its frictional engagement with plates on opposite sides thereof to increase as the plates are pressed together.

28. In a clutch, a clutch engaging element to which force is appliable to establish a power transmitting condition of the clutch, yieldably displaceable means, an advanceable structure having spaced portions of which one is in force applying relation with said yieldably displaceable means to displace the same pursuant to a preliminary advancement of said structure, said structure being advanceable by the application of an operating force to an intermediate portion, fulcrum means for applying said operating force to said intermediate structure portion, means operable to cause said advanceable structure to apply said operating force solely through the one spaced portion to the yieldably displaceable means coexistently with said preliminary advancement, and the other of said spaced portions being associated with said clutch engaging element to apply a fraction of said operating force thereto following said preliminary advancement and while the reactionary complement of said force fraction reacts through said intermediate portion of the structure in prying fashion across the fulcrum means against the yieldably displaceable means.

OSCAR H. BANKER.

REFERENCES CITED

The following references are of record in the file of this patent:

UNITED STATES PATENTS

| Number | Name | Date |
|---|---|---|
| 2,309,597 | Kacic | Jan. 26, 1943 |
| 1,713,278 | Goranson et al. | May 14, 1929 |
| 2,108,969 | Lewis | Feb. 22, 1938 |
| 1,571,746 | Wemp | Feb. 2, 1926 |
| 1,861,830 | Banker | June 7, 1932 |
| 1,306,302 | Cooper | June 10, 1919 |
| 2,129,361 | Ruesenberg et al. | Sept. 6, 1938 |
| 2,184,135 | Batten | Dec. 19, 1939 |
| 1,791,016 | Sundh | Feb. 3, 1931 |